(12) United States Patent
Lv et al.

(10) Patent No.: US 11,840,307 B2
(45) Date of Patent: Dec. 12, 2023

(54) DAMPING MECHANISM AND VEHICLE

(71) Applicant: NINEBOT (CHANGZHOU) TECH CO., LTD., Changzhou (CN)

(72) Inventors: Ronghui Lv, Changzhou (CN); Can Wang, Changzhou (CN); Min Xia, Changzhou (CN)

(73) Assignee: NINEBOT (CHANGZHOU) TECH CO., LTD., Changzhou (CN)

( * ) Notice: Subject to any disclaimer, the term of this patent is extended or adjusted under 35 U.S.C. 154(b) by 0 days.

(21) Appl. No.: 17/584,493

(22) Filed: Jan. 26, 2022

(65) Prior Publication Data

US 2022/0266943 A1 Aug. 25, 2022

(30) Foreign Application Priority Data

Feb. 22, 2021 (CN) .......................... 202110199015.5

(51) Int. Cl.
*B62K 25/04* (2006.01)
*B62K 3/00* (2006.01)

(52) U.S. Cl.
CPC ............. *B62K 25/04* (2013.01); *B62K 3/002* (2013.01); *B62K 2025/045* (2013.01)

(58) Field of Classification Search
CPC ..... F16F 9/56; F16F 1/545; F16F 1/14; B62K 3/002; B62K 24/04; B60G 11/225; B60G 2202/1424; B60G 11/18; B60K 25/00
See application file for complete search history.

(56) References Cited

U.S. PATENT DOCUMENTS

| 6,447,073 B1 | 9/2002 | Goettker |
| 7,980,577 B2 * | 7/2011 | Vandenberg ........... B60G 11/62 |
| | | 280/124.128 |

(Continued)

FOREIGN PATENT DOCUMENTS

| CH | 191116 A | 5/1937 |
| CN | 204979091 U | 1/2016 |

(Continued)

OTHER PUBLICATIONS

Extended European Search Report dated Jul. 29, 2022 for Application No. 22152276.6, 8 pages.

(Continued)

*Primary Examiner* — Paul N Dickson
*Assistant Examiner* — Tiffany L Webb
(74) *Attorney, Agent, or Firm* — Frost Brown Todd LLP (57) ABSTRACT

A damping mechanism and a vehicle are provided. The damping mechanism includes: a spindle; an elastic cushion assembly used to couple the spindle and the vehicle body; a coupling arm having a first end used to be fixedly coupled to an axle of the wheel and a second end pivotally coupled to the spindle; and a locking assembly provided between the coupling arm and the spindle and used to switch the coupling arm and the spindle between at least two locking states and a unlocking state. In the unlocking state, the coupling arm is rotatable, and in the locking states, the coupling arm is locked; in each of the locking states, the coupling arm is in different locking positions relative to the spindle; and when the coupling arm is in different locking positions, the coupling arm is at different angles to a horizontal plane.

18 Claims, 4 Drawing Sheets

(56) References Cited

U.S. PATENT DOCUMENTS

| | | | | |
|---|---|---|---|---|
| 8,191,911 | B1 * | 6/2012 | Reynolds | B60G 3/20 |
| | | | | 280/124.13 |
| 8,226,101 | B2 * | 7/2012 | Lariviere | B60G 11/225 |
| | | | | 280/124.169 |
| 8,360,448 | B2 | 1/2013 | Lariviere | |
| 8,573,621 | B1 * | 11/2013 | Reynolds | B60G 11/225 |
| | | | | 280/124.13 |
| 9,039,034 | B2 * | 5/2015 | VanDenberg | B60G 5/04 |
| | | | | 280/684 |
| 9,802,660 | B2 * | 10/2017 | Johnson | B60G 11/225 |
| 10,434,833 | B1 * | 10/2019 | Samet | B60G 11/225 |
| 11,008,040 | B2 | 5/2021 | Gerhards | B60L 50/64 |
| 11,614,120 | B2 * | 3/2023 | Liu | B62K 3/002 |
| | | | | 403/84 |

FOREIGN PATENT DOCUMENTS

| | | |
|---|---|---|
| CN | 206914550 U | 1/2018 |
| CN | 207496867 U | 6/2018 |
| CN | 207496878 U | 6/2018 |
| CN | 108791644 A | 11/2018 |
| CN | 209581745 U | 11/2019 |
| CN | 209972703 U | 1/2020 |
| CN | 210027780 U | 2/2020 |
| CN | 214698928 U | 11/2021 |
| FR | 2778371 | 11/1999 |
| KR | 101988464 B1 | 6/2019 |

OTHER PUBLICATIONS

Chinese Office Action dated Sep. 20, 23 for Application No. 20211019901.5, 33 pages.

* cited by examiner

FIG. 6

DAMPING MECHANISM AND VEHICLE

CROSS-REFERENCE TO RELATED APPLICATIONS

The present application is based on and claims priority to Chinese Patent Application Serial No. 202110199015.5, filed on Feb. 22, 2021, the entire content of which is incorporated herein by reference.

FIELD

The present disclosure relates to a field of transportation tools, and more particularly to a damping mechanism and a vehicle.

BACKGROUND

Electric scooters are transportation tools based on conventional manual scooters with electric kit added. The electric scooter has advantages of small volume, simple operation, easy carrying, etc., and is favored by consumers. In order to enhance the stability of the electric scooter, generally the front and rear of the scooter are each provided with a damping mechanism, to avoid damage to the components during the travelling of the electric scooter.

In the related art, the electric scooter has a fixed damping stroke, and the damping stroke cannot be adjusted according to the needs of different users.

SUMMARY

In view of the above problems, the present disclosure provides a damping mechanism and a vehicle to solve the above-described problems or at least partially solve the above-described problems.

A first aspect of embodiments of the present disclosure provides a damping mechanism applied to a vehicle, a vehicle body and a wheel of the vehicle are coupled through the damping mechanism, and the damping mechanism includes:

a spindle:

an elastic cushion assembly used to couple the spindle and the vehicle body:

a coupling arm having a first end used to be fixedly coupled to an axle of the wheel and a second end pivotally coupled to the spindle; and a locking assembly provided between the coupling arm and the spindle and used to switch the coupling arm and the spindle between at least two locking states and an unlocking state, in the unlocking state, the coupling arm is rotatable relative to the spindle, and in the locking states, the coupling arm is locked relative to the spindle; in each of the locking states, the coupling arm is in different locking positions relative to the spindle; and when the coupling arm is in different locking positions, the coupling arm is at different angles relative to a horizontal plane.

A second aspect of the embodiments of the present disclosure provides a vehicle, including a vehicle body, a front end and/or a rear end of the vehicle body being mounted with a damping mechanism. The damping mechanism includes: a spindle; an elastic cushion assembly configured to couple the spindle and the vehicle body;

a coupling arm having a first end configured to be fixedly coupled to an axle of the wheel and a second end pivotally coupled to the spindle; and a locking assembly provided between the coupling arm and the spindle and configured to switch the coupling arm and the spindle between at least two locking states and an unlocking state, wherein in the unlocking state, the coupling arm is rotatable relative to the spindle, and in the locking states, the coupling arm is locked relative to the spindle; in each of the locking states, the coupling arm is in different locking positions relative to the spindle; and when the coupling arm is in different locking positions, the coupling arm is at different angles relative to a horizontal plane.

In the damping mechanism and the vehicle provided by the embodiments of the present disclosure, the spindle is provided with the elastic cushion assembly, the elastic cushion assembly is coupled to the vehicle body to achieve a damping effect for the vehicle; the coupling arm has a first end fixedly coupled to an axle of the wheel and a second end pivotally coupled to the spindle, and the locking assembly switches the coupling arm and the spindle between a plurality of locking states and a unlocking state. When the user needs to adjust a damping stroke, the spindle and the coupling arm are unlocked, and the coupling arm is rotated such that an angle of the coupling arm relative to a horizontal plane is changed, a height of the vehicle body from the ground is changed and thus the damping stroke is changed; then, the locking assembly is operated to lock the coupling arm and the spindle in the locking state to maintain the damping stroke. Therefore, the present technical solution can adjust damping stroke of the vehicle, thereby meeting the needs of different users.

BRIEF DESCRIPTION OF THE DRAWINGS

To describe technical solutions in embodiments of the present disclosure or in the related art more clearly, the following will briefly introduce the accompanying drawings required for the description of the embodiments or the related art. Obviously, the accompanying drawings described below show some embodiments of the present disclosure, and those skilled in the art can obtain other drawings based on these drawings without paying creative efforts.

DETAILED DESCRIPTION

Technical solutions in embodiments of the present disclosure will be clearly and completely described below with reference to the accompanying drawings in the embodiments of the present disclosure. Obviously, the embodiments described herein are only a part but not all of the embodiments of the present application. Based on the embodiments of the present disclosure, all other embodiments obtained by those skilled in the art without paying creative efforts, fall into the protection scope of the present application.

The "including" mentioned in the entire specification and claims is an open term, so it should be interpreted as "including but not limited to". "Substantially" means that within the acceptable error range, those skilled in the art can solve the technical problem within a certain error range, and the technical effect can be substantially achieved.

In addition, the term "coupled" here includes any direct and indirect connection means. Therefore, if the text describes that a first device is coupled to a second device, it means that the first device can be directly coupled to the second device, or indirectly coupled to the second device through other devices. The following description of the specification is preferred embodiments for implementing the present disclosure, but the description is for the purpose of explaining the general principles of the present disclosure, and is not intended to limit the scope of the present disclosure. The protection scope of the present disclosure shall be subject to those defined by the appended claims.

It should be understood that the term "and/or" used herein is only an association relationship that describes associated objects, which means that there can be three relationships. For example, A and/or B can mean three cases that: A alone exists; both A and B exist at the same time; C alone exists. In addition, the character "/" herein generally means that the associated objects before and after are an "or" relationship.

Embodiment 1

Figure 1:
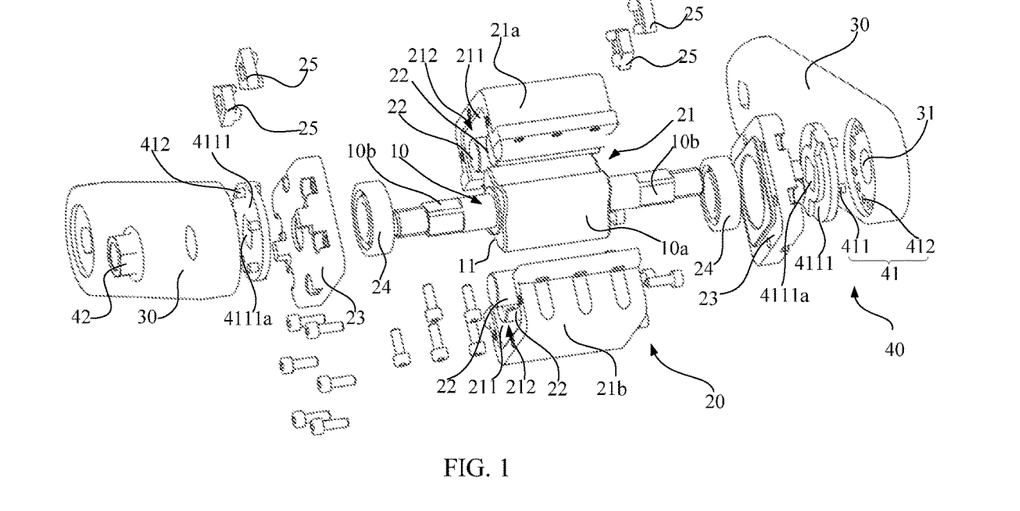
FIG. 1 is an exploded schematic view of a damping mechanism according to an embodiment of the present disclosure.

FIG. 1 is an explored schematic view of a damping mechanism according to an embodiment of the present disclosure. With reference to FIG. 1, the present embodiment provides a damping mechanism applied to a vehicle (not illustrated in the figures), and the vehicle to which the damping mechanism in the present embodiment is applied is preferably an electric scooter. Certainly, in some embodiments, the vehicle may be a non-electric scooter, an electric bicycle, a bicycle, etc. Generally, the electric scooter, the non-electric scooter, the electric bicycle, the bicycle, etc. include a vehicle body, a front wheel located at a front end of the vehicle body, and a rear wheel located at a rear end of the vehicle body. In the present embodiment, the vehicle body and the wheel of the vehicle are coupled through the damping mechanism.

The damping mechanism includes a spindle 10, an elastic cushion assembly 20, a coupling arm 30, and a locking assembly 40.

The elastic cushion assembly 20 is used to couple the spindle 10 to the vehicle body. The elastic cushion assembly 20 may be detachably and fixedly coupled to the vehicle body, or undetachably and fixedly coupled to the vehicle body, or integrally molded with the vehicle body.

The coupling arm 30 has a first end used to be fixedly coupled to an axle of the wheel and a second end pivotally coupled to the spindle 10. In the present embodiment, preferably, the first end of the coupling arm 30 is detachably and fixedly coupled to the axle of the wheel, such that the damping mechanism can match different vehicles for assembly, and the range of application can be extended. Certainly, in some other embodiments, the first end of the coupling arm 30 may also be undetachably and fixedly coupled to the axle of the wheel. It should be noted that, in the present embodiment, the coupling arm 30 being pivotally coupled to the spindle 10 refers to the coupling arm 30 being at least rotatable about an axis of the spindle 10 in some state.

The wheel is coupled to the spindle 10 through the coupling arm 30, and the spindle 10 is coupled to the vehicle body through the elastic cushion assembly 20. A damping stroke of the whole vehicle is affected by a height of the vehicle in addition to the elastic cushion assembly 20. It could be understood that, the larger the height of the vehicle body, the longer the damping stroke is, while the smaller the height of the vehicle body, the shorter the damping stroke is. In specific use, when the weight of the user is heavier, the damping stroke needs to become longer, to achieve good damping effect; while when the weight of the user is lighter, the damping stroke does not need to be excessively long, and in this case, the height of the vehicle body may be at a low level.

In order to adjust the damping stroke of the vehicle, the damping mechanism of the present embodiment further includes a locking assembly 40. The locking assembly 40 is provided between the coupling arm 30 and the spindle 10, to switch the coupling arm 30 and the spindle 10 between at least two locking states and an unlocking state.

In the unlocking state, the coupling arm 30 is rotatable relative to the spindle 10, and in the locking states, the coupling arm 30 is locked relative to the spindle 10; in each of the locking states, the coupling arm 30 is in different locking positions relative to the spindle 10; and when the coupling arm 30 is in different locking positions, the coupling arm 30 is at different angles to a horizontal plane. The horizontal plane refers to a surface on which the vehicle travels.

Specifically, the user can operate the locking assembly to switch the locking assembly between the locking states and the unlocking state. In the unlocking state, the user can rotate the coupling arm 30 relative to the spindle 10 to adjust the angle of the coupling arm 30 and the horizontal plane, thereby adjusting the height of the vehicle body; after adjusted to the desired height, the coupling arm 30 and the spindle 10 are locked by the locking assembly, and they cannot rotate relative to each other, and the vehicle body is stabilized at this height.

Figure 5:
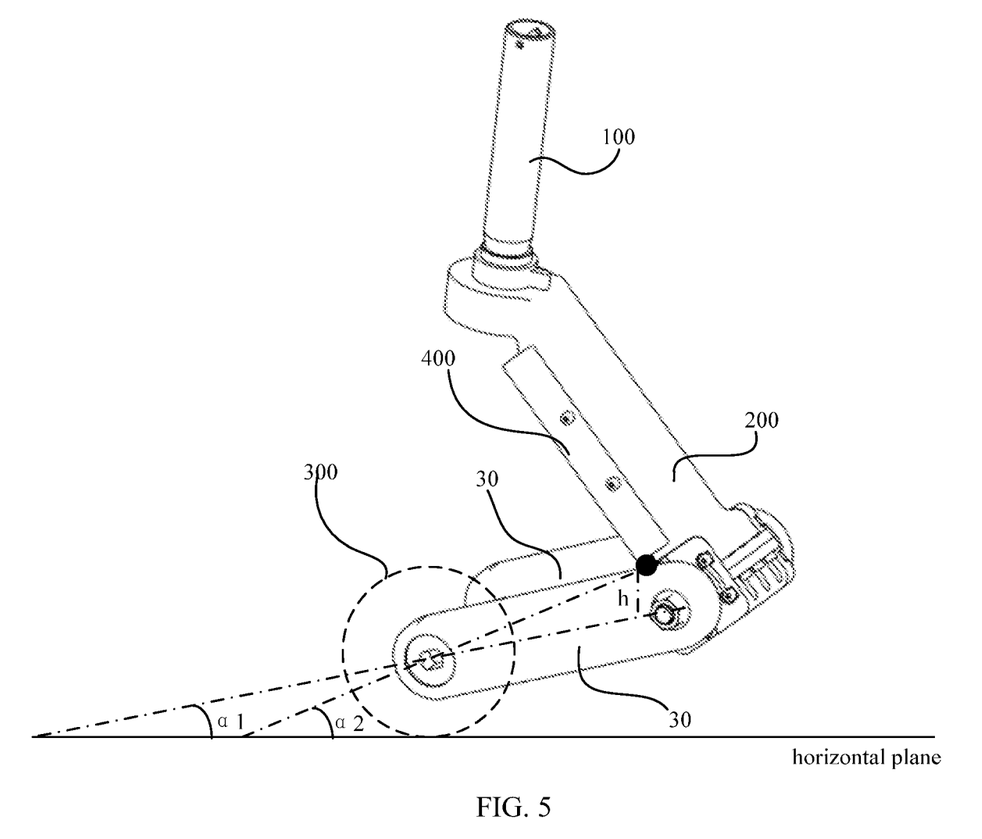
FIG. 5 is a view showing a coupling state of a damping mechanism and a coupling rod of a front end of an electric scooter provided by an embodiment of the present disclosure.
Figure 6:
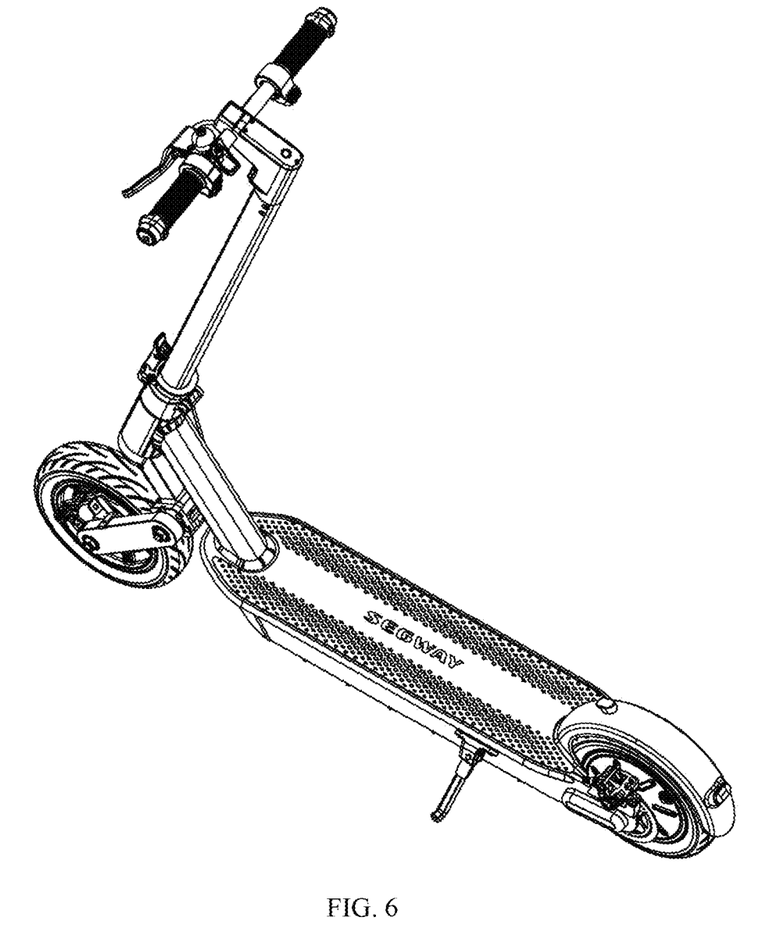
FIG. 6 is a perspective view of a vehicle according to an embodiment of the present disclosure.

FIG. 5 is a view showing a coupling state of a damping mechanism and a coupling rod of a front end of an electric scooter provided by an embodiment of the present disclosure. With reference to FIG. 5, an angle of the coupling arm 30 and the horizontal plane in an initial state of the vehicle may be set to be $\alpha 1$, when the damping stroke needs to be lengthened, the coupling arm 30 may be rotated counterclockwise relative to the spindle 10 to a position where the angle of the coupling arm 30 and the horizontal plane is $\alpha 2$. In this case, a coupling end (a solid black point in FIG. 5) of the coupling arm 30 and the spindle 10 rises by a height h, the whole vehicle body rises by the height h; furthermore, the coupling arm 30 and the spindle 10 are locked by the locking assembly, the coupling arm 30 is maintained at these angle and height to reach the desired damping stroke.

It should be noted that, the angle of the coupling arm 30 and the horizontal plane is rotated from $\alpha 1$ to $\alpha 2$, which is just an example. An adjustable range of the coupling arm 30 may not only be limited to rotating from the angle $\alpha 1$ to the angle $\alpha 2$, but can also be adjusted to multiple or any one of angles $\alpha 3 \sim \alpha 10$ (not illustrated in the figures). An adjusting mode of the coupling arm 30 may be a stepped adjustment. That is, the number of the adjustable angles of the coupling arm 30 is finite. However, in some embodiments, the adjusting mode of the coupling arm 30 may be a stepless adjustment. That is, the number of the adjustable angles of the coupling arm 30 is infinite, which is not limited by the present embodiment.

Additionally, in the present embodiment, preferably, as illustrated in FIG. 1, two locking assemblies 40 are provided, and the two locking assemblies 40 are symmetrically provided to two sides of the elastic cushion assembly 20. Further, two coupling arms 30 are provided, and the two coupling arms 30 are respectively fitted with corresponding locking assemblies 40. By providing the two locking assemblies 40 and the two coupling arms 30 respectively fitted with the corresponding locking assemblies 40, the force on two sides of the vehicle is balanced, ensuring traveling safety of the vehicle.

Certainly, in some embodiments, one locking assembly 40 may be provided, and correspondingly one coupling arm 30 may be provided. The fitting of the one coupling arm 30 and the one locking assembly 40 can also achieve height adjustment of the vehicle body of the vehicle, thereby adjusting the damping stroke.

In the damping mechanism provided by the embodiments of the present disclosure, the spindle is provided with the elastic cushion assembly, the elastic cushion assembly is coupled to the vehicle body to achieve a damping effect for the vehicle; the coupling arm has a first end fixedly coupled to an axle of the wheel and a second end pivotally coupled to the spindle, and the locking assembly switches the coupling arm and the spindle between a plurality of locking states and an unlocking state. When the user needs to adjust a damping stroke, the spindle and the coupling arm are unlocked, and the coupling arm is rotated such that an angle of the coupling arm relative to a horizontal plane is changed, a height of the vehicle body from the ground is changed and thus the damping stroke is changed; then, the locking assembly is operated to lock the coupling arm and the spindle in the locking state to maintain the damping stroke. Therefore, the present technical solution can adjust damping stroke of the vehicle, thereby meeting the needs of different users, particularly the needs of users having different weights.

Furthermore, based on the above embodiment, as illustrated in FIG. 1, the locking assembly 40 includes an anti-rotation assembly 41 and an axial limiting member 42. The anti-rotation assembly 4l is provided between the coupling arm 30 and the spindle 10, and used to hinder relative rotation of the coupling arm 30 and the spindle 10 in the locking state. The axial limiting member 42 is movably provided to the spindle 10, the coupling arm 30 has a through hole 31 for the spindle 10 passing through, and the axial limiting member 42 is located at a side of the coupling arm 30 away from the anti-rotation assembly 41 and is used to abut against the coupling arm 30 along an axial direction in the locking state.

Specifically, the axial limiting member 42 being movably provided to the spindle 10 may refer to the axial limiting member 42 being movable relative to the spindle 10. For example, the axial limiting member 42 may be moved along the axial direction to abut or not abut against the coupling arm 30, or, the axial limiting member 42 is detachably coupled to the spindle 10. When the axial limiting member 42 abuts against the coupling arm 30, the axial limiting member 42 locks the coupling arm 30 and the spindle 10; and when the axial limiting member 42 does not abut against the coupling arm 30, the axial limitation of the coupling arm 30 on the spindle 10 is removed.

In the present embodiment, as illustrated in FIG. 1, the axial limiting member 42 may be a nut, and the spindle 10 may have a thread corresponding to the nut on a position of the spindle for mounting the axial limiting member 42. By providing a nut on the spindle 10 and at a side of the coupling arm 30 away from the anti-rotation assembly 41, the nut applies a pretightening force to the coupling arm 30 along the axial direction, to stabilize the coupling arm 30 in the locking state. However, when the nut is unscrewed, or the nut is detached from the spindle 10, the locking of the coupling arm 30 with the spindle 10 may be removed under the action of an external force, such that the angle of the coupling arm 30 is adjustable.

Additionally, in some embodiments, the axial limiting member 42 may also be a pin, and the pin may be inserted into the spindle 10 along a radial direction of the spindle 10. In a specific design, the pin may be tightly abutted against the coupling arm 30 to prevent the coupling arm 30 from loosening, and to maintain the coupling arm 30 in the locking position.

Further, the axial limiting member 42 and the coupling arm 30 may also be provided with a pressing member therebetween (not illustrated in FIG. 1), and the pressing member is squeezed between the coupling arm 30 and the axial limiting member 42. Specifically, the pressing member may be a rubber ring, or a metallic or non-metallic gasket. By providing the pressing member, the axial limiting member 42 may be prevented from loosening. On the other hand, the axial limiting member 42 may be prevented from damaging an outer surface of the coupling arm 30. Particularly, the nut can be prevented from wearing and tearing the surface of the coupling arm 30 during screwing or unscrewing, thereby effectively prolonging the service life of the components.

In the present embodiment, the elastic cushion assembly 20 includes a cushioning cavity 21 and a cushioning member 22. The cushioning cavity 21 includes a cavity wall 211 and a receiving cavity 212 enclosed by the cavity wall 211. The cavity wall 211 is fitted over the spindle 10, and is fixedly coupled to the vehicle body; and the cushioning member 22 is accommodated in the receiving cavity 212 and abuts against the cavity wall 211 and the spindle 10.

Specifically, the cavity wall 211 maybe integrally molded with or fixedly coupled to the vehicle body, such that a weight of an upper part of the vehicle body can be stably cushioned by the elastic cushion assembly 20, and transferred to the wheel. The elastic cushion assembly 20 is reliably fixed to the vehicle body, resulting in a high safety coefficient.

In the present embodiment, the receiving cavity 212 may be substantially cylindrical. The cylindrical receiving cavity 212 can receive uniform force everywhere in a circumferential direction, and can effectively improve the force balance. Certainly, in some other embodiments, the receiving cavity 212 may have a substantially rectangular shape, a hexahedral shape or other shapes.

The cushioning member 22 may include at least one of a rubber member, a torsion spring and a leaf spring. In the present embodiment, preferably, the cushioning member 22 is a rubber member, and the rubber members may be evenly distributed along the circumferential direction of the receiving cavity 212. In some embodiments, when the cushioning member 22 is the torsion spring, the torsion spring may be fitted over the spindle 10, and has a first torsion arm abutting against or fixedly coupled to the spindle 10 and a second torsion arm abutting against or fixedly coupled to the cavity wall 211. In some embodiments, when the cushioning member 22 is the leaf spring, a top of the leaf spring abuts against or is fixedly coupled to the cavity wall 211, and two sides of a bottom of the leaf spring abuts against or is fixedly coupled to the spindle 10.

In the present embodiment, preferably, the cushioning member 22 includes the rubber member. The rubber member may be integrally vulcanization-molded with the cavity wall 211; or, the rubber member and the spindle 10 are integrally vulcanization-molded; or, the rubber member, the cavity wall 211, and the spindle 10 are vulcanized together. The molding mode is simple, and the structural stability is excellent.

As illustrated in FIG. 1, when the cushioning member 22 includes the rubber member, the rubber member may be cylindrical, and a side wall of the spindle 10 is defined with a groove 11 matching with the rubber member, and the rubber member is accommodated in the groove 11 along an axial direction parallel to the spindle 10. A part of a surface of the rubber member matches with the groove 11. By providing the groove 11 in the spindle 10 to accommodate the cylindrical rubber member, contact area of the rubber member and the spindle 10 is increased, such that the rubber member is more advantageously prevented from slipping relative to the spindle 10, the position arrangement between the rubber member and the spindle 10 is reasonable, and the structure is compact.

Furthermore, a plurality of rubber members are provided, the number of the grooves 11 in the spindle 10 is identical to the number of the rubber members, and the plurality of rubber members are evenly distributed in the circumferential direction of the spindle 10. Thus, the elastic cushion assembly 20 can perform uniform vibration reduction in all directions to the greatest extent. As illustrated in FIG. 1, the spindle 10 has four evenly distributed grooves 11, and four cylindrical rubber members are respectively attached to and in contact with the corresponding grooves 11, and abut against the cavity wall 211. Certainly, the number of the rubber members and the grooves 11 is not limited to this.

As illustrated in FIG. 1, further, the whole spindle 10 may include a middle segment 10a used to be fitted with the cushioning member 22. As the cushioning member 10a is mainly used to support the vehicle body, a diameter of the middle segment 10a may be greater than diameters of other parts of the spindle 10, to guarantee the strength of a main stress segment of the spindle 10 and to ensure that the spindle 10 is not easy to deform and fracture. The groove 11 may be defined in an outer surface of the middle segment 10a of the spindle 10, and when the cushioning member 10a is the rubber member, the rubber member is fitted in the groove 11 in the outer surface of the middle segment 10a.

Embodiment 2

On basis of the embodiment 1, the present embodiment provides some types of specific anti-rotation assemblies, to achieve the stepped adjustment for the angle of the coupling arm 30 relative to the horizontal plane.

The anti-rotation assembly 41 includes a positioning member 411 provided to one of the spindle 10 and the coupling arm 30; and a fitting part 412 provided to the other of the spindle 10 and the coupling arm 30. The positioning member 411 and the fitting part 412 have a plurality of fitting positions such that the coupling arm 30 is in different locking positions relative to spindle 10, the positioning member 411 is fixed relative to the fitting part 412 along a circumferential direction, and the positioning member 411 and the fitting part 412 are separable from each other along the axial direction in the unlocking state.

More specifically, with reference to FIG. 1 again, the anti-rotation assembly 41 in the present embodiment includes at least two positioning members 411 and a plurality of fitting parts 412.

The positioning members 411 may be provided to one of the spindle 10 and the coupling arm 30, the plurality of fitting parts 412 may be provided to the other of the spindle 10 and the coupling arm 30, and the plurality of fitting parts 412 may be distributed about an axis of the spindle 10 in the circumferential direction. Specifically, as illustrated in FIG. 1, the positioning members 411 are provided to the spindle 10, the plurality of fitting parts 412 are provided to a side of the coupling arm 30 towards the positioning member 411, and the plurality of fitting parts 412 may be evenly distributed about an axis of the through hole 31 of the coupling arm 30 (which coincides with the axis of the spindle 10).

The positioning member 411 is selectively fitted with a part of the plurality of fitting parts 412, and the number of the fitting parts 412 is greater than the number of the positioning members 411, to adjust the locking position of the coupling arm 30.

In the present embodiment, the positioning member 411 may be a protrusion extending towards the coupling arm 30, and the fitting part 412 may be a groove or a recess fitted with the protrusion. The groove or the recess may be directly defined in the coupling arm 30. When processing the coupling arm 30, a plurality of grooves or recesses may be directly arranged in the coupling arm 30 and around the axis corresponding to the spindle 10 along the circumferential direction. As illustrated in FIG. 1, the protrusion may be cylindrical, and the protrusions may be arranged in parallel along the axis parallel to the spindle 10. When the coupling arm 30 rotates to different angles, the protrusion may be inserted into different grooves or recesses, to achieve adjustment for different angles of the coupling arm 30 and the horizontal plane, and then the coupling arm 30 is locked at the current angle after adjustment by the axial limiting member 42.

Furthermore, a positioning disc 4111 is fitted over the spindle 10, the positioning disc 4111 is fixed to the spindle 10 along the circumferential direction, and the protrusion is formed on the positioning disc 4111. A portion of the spindle 10 used to be fitted with the positioning disc 4111 may have a non-circular cross section, and the positioning disc 4111 may have a through hole fitted with the non-circular portion of the spindle 10. For example, as illustrated in FIG. 1, the spindle 10 has a square shaft segment 10b, the square shaft segment 10b has a square cross section; correspondingly, the through hole in the positioning disc 4111 fitted with the square shaft segment 10b is a square hole 4111a, to achieve the circumferential positioning of the positioning disc 4111 and the spindle 10. The protrusion is provided to the positioning disc 4111, and the positioning disc 4111 may be only circumferentially fixed to the spindle 10, but may be axially moved, facilitating disassembly and assembly of the positioning disc 4111.

Certainly, in some embodiments, the positioning disc 4111 may further be integrally molded with or directly and completely fixedly coupled to the spindle 10, which is not limited by the present disclosure.

Certainly, in some other embodiments, the positioning member 411 may also be provided to the coupling arm 30, and the fitting part 412 may be provided to the spindle 10, as long as the purpose of anti-rotation between the coupling arm 30 and the spindle 10 can be realized through fitting of the positioning member 411 and the fitting part 412.

In some other embodiments, in order to realize the stepped adjustment for the angle of the coupling arm 30 relative to the horizontal plane, it can also be that, the positioning member 411 is a spline formed on the spindle 10, and the fitting part 412 is a spline hub structure formed on the coupling arm 30; or, the positioning member 411 is a knurl, and the fitting part 412 is a knurled groove formed on the coupling arm 30 and used to be fitted with the knurl, and so on. There are also many structures to realize the stepless adjustment of the coupling arm 30, which is not specifically limited by the present disclosure. The anti-rotation mode of the coupling arm 30 and the spindle 10 provided by the present embodiment can achieve stepped adjustment for the angle of the coupling arm 30 relative to the horizontal plane; and the user can choose an appropriate angle from a plurality of preset adjustable angles according to the needs, to adjust the height of the vehicle body relative to the horizontal plane in a stepped manner, and to adjust the damping stroke of the damping mechanism in a stepped manner.

Embodiment 3

Figure 2:
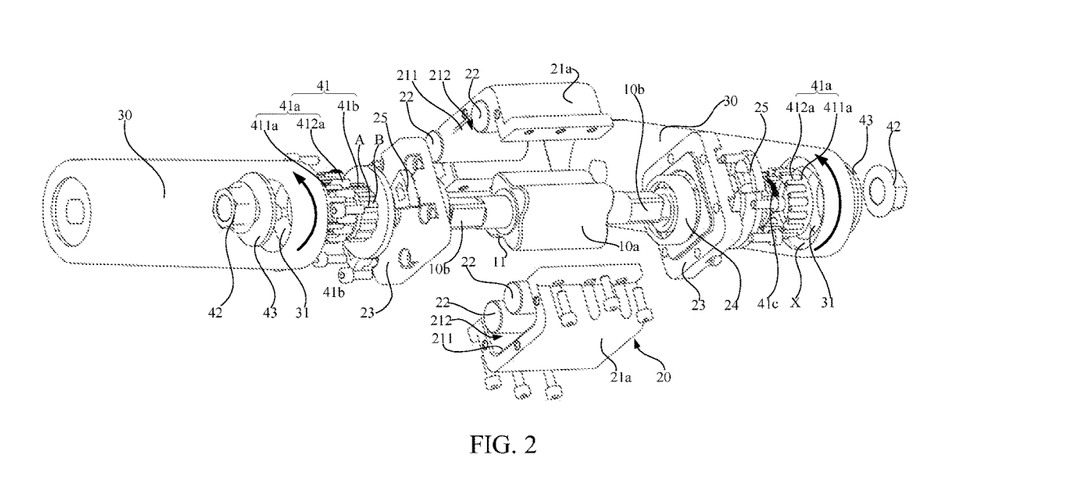
FIG. 2 is an exploded schematic view of a damping mechanism according to another embodiment of the present disclosure.

On basis of embodiment 1, the present embodiment provides an anti-rotation assembly different from embodiment 2. The anti-rotation assembly 41 provided in the present embodiment can achieve stepless adjustment for the angle of the coupling arm 30 relative to the horizontal plane. FIG. 2 is an exploded schematic view of a damping mechanism according to another embodiment of the present disclosure. As illustrated in FIG. 2, the anti-rotation assembly 41 of the damping mechanism provided by the present embodiment includes a first anti-rotation member 41a and a second anti-rotation member 41b. The first anti-rotation member 41a is provided to the coupling arm 30.

The second anti-rotation member 41b is provided to the spindle 10, and is circumferentially fixed to the spindle 10. The circumferential fixing mode of the second anti-rotation member 41b and the spindle 10 may be identical to the circumferential fixing mode of the positioning disc 4111 in embodiment 1. The details may refer to the description of embodiment 1, and certainly, the present disclosure may also not be limited to this.

The first anti-rotation member 41a is fitted over the second anti-rotation member 41b, and the second anti-rotation member 41b has a latch position A and a non-latch position B on a side surface of the second anti-rotation member. In the locking state, the first anti-rotation member 41a abuts against the latch position A of the second anti-rotation member 41b, to grip the coupling arm 30, the first anti-rotation member 41a, and the second anti-rotation member 41b tightly. In the unlocking state, the first anti-rotation member 41a moves to the non-latch position of the second anti-rotation member 41b, to enable relative rotation of at least two of the coupling arm 30, the first anti-rotation member 41a, and the second anti-rotation member 41b. As long as the first anti-rotation member 41a moves to the non-latch position B relative to the second anti-rotation member 41b, the coupling arm 30 can rotate continuously and steplessly relative to the spindle 10. Thus, the coupling arm 30 can be adjusted to any angle, and then the coupling arm 30 can be fixed at the desired angle by the axial limiting member 42.

More specifically, as illustrated in FIG. 2, the latch position A and the non-latch position B are distributed along a radial direction of the second anti-rotation member 41b, a diameter corresponding to the latch position A is greater than a diameter corresponding to the non-latch position B. As such, by operating the first anti-rotation member 41a, the first anti-rotation member 41a rotates relative to the second anti-rotation member 41b, the radially relative position of the first anti-rotation member 41a and the second anti-rotation member 41b is changed, such that the locking position can be switched to the unlocking position.

Specifically, as illustrated in FIG. 2, the first anti-rotation member 41a may include a roller cage 411a and a plurality of rollers 412a provided to the roller cage 411a. The roller cage 411a may be provided in the accommodating cavity X of the coupling arm 30, the plurality of rollers 412a may be distributed to a side surface of the roller cage 411a along the circumferential direction, and the roller 412a is movable in the radial direction of the roller cage 411a. The second anti-rotation member 41b may be a ratchet wheel, the ratchet wheel is circumferentially fixed to the spindle 10, and the ratchet wheel is fitted inside the roller cage 411a.

Specifically, as illustrated in FIG. 2, the roller 412a may have a cylindrical shape, and the plurality of rollers 412a may be evenly arranged to a circumferential side surface of the roller cage 411a, such that the roller cage 411a can receive uniform force in the circumferential direction and is not easy to deform.

In the locking state, the roller 412a may abut between the cavity wall of the accommodating cavity X and the latch position A of the ratchet wheel, to grip the coupling arm 30, the roller 412a and the ratchet wheel tightly. The ratchet wheel, the roller 412a, and the coupling arm 30 constitute a tensioning mechanism, to provide a resistance for hindering the rotation of the coupling arm 30. In the unlocking state, the roller 412a moves to the non-latch position of the ratchet wheel along the radial direction, and the coupling arm 30 can rotate relative to the roller cage 411a and the ratchet wheel. Specifically, the outer surface of the ratchet wheel has an inclined latch shape, as illustrated in FIG. 2. During the switching from the locking state to the unlocking state, the limitation of the axial limiting member 42 is removed, then a force is exerted to rotate the coupling arm 30 in a direction illustrated in FIG. 2, and the coupling arm 30 drives the roller 412a to have a transient displacement under the action of a friction force between the coupling arm 30 and the roller 412a, to rotate the roller 412a towards a small diameter direction of the ratchet wheel. That is, the first anti-rotation member 41a is rotated from the locking position to the unlocking position relative to the second anti-rotation member 41b, the roller 412a retracts inwards by a small displacement along the radial direction, and the coupling arm 30 can continue to rotate to the desired angle.

It could be understood that, when the first anti-rotation member 41a and the second anti-rotation member 41b employ a latching mode of the ratchet wheel and the roller 412a, the coupling arm 30 only can rotate in a direction that increases the height of the vehicle body, but cannot rotate in a direction that reduces the height of the vehicle body (as indicated by a thick arc arrow in FIG. 2, it only can rotates counterclockwise). If the height of the vehicle body needs to be reduced, the coupling arm 30 and the first anti-rotation member 41a need to be pulled outwards along the axial direction from the second anti-rotation member 41b, and the first anti-rotation member 41a and the second anti-rotation member 41b are assembled together again after the angle of the coupling arm 30 is adjusted.

Furthermore, the anti-rotation assembly 41 further includes an elastic return member 41c. The elastic return member 41c has a first end coupled to the ratchet wheel, and a second end coupled to the roller cage 411a, and during the rotation of the roller 412a from the latch position to the non-latch position, the deformation of the elastic return member 41c increases. Thus, when the coupling arm 30 rotates to the desired position and stops the rotation, the deformation of the elastic return member 41c recovers, and the roller cage 411a and the roller 412a are pulled back to the locking position of the ratchet wheel, such that the ratchet wheel, the roller 412a, and the coupling arm 30 are tensioned and not easy to rotate, and the user can completely lock the coupling arm 30 by screwing the axial limiting member 42.

It should be noted that, in both the locking state and the unlocking state, the elastic return member 41c is in a deformation state, but in the unlocking state, the elastic return member 41c has greater deformation. Additionally, in the present embodiment, the elastic return member 41c may be a tension spring, or a torsion spring, which is not limited by the present embodiment.

In some embodiments, the first anti-rotation member 41a and the second anti-rotation member 41b can also employ a double cone structure to perform the locking, which is not limited by the present disclosure.

Figure 4:
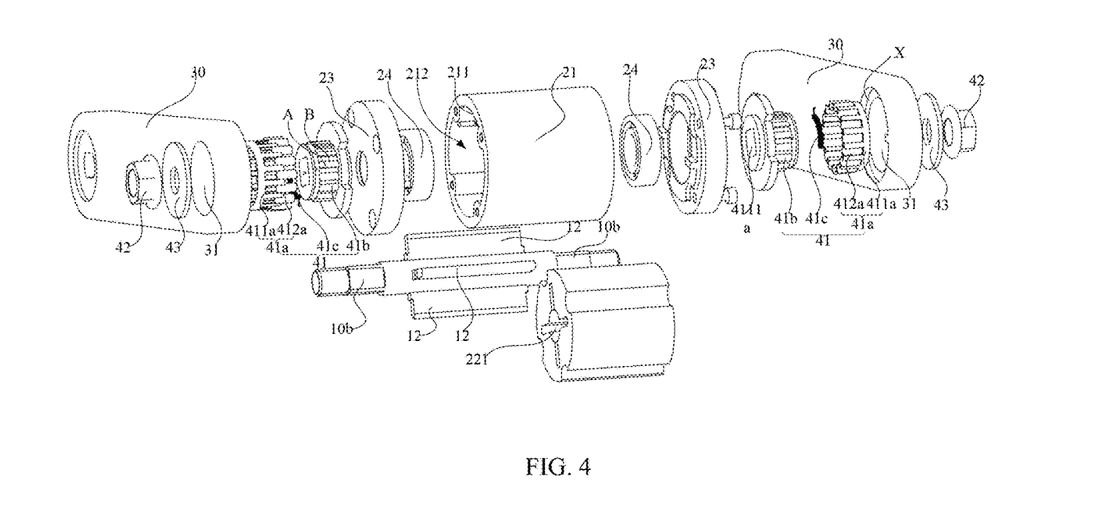
FIG. 4 is an exploded schematic view of a damping mechanism according to still another embodiment of the present disclosure.

Additionally, as regard to the latching structure of the axial limiting member 42 and the coupling arm 30, as illustrated in FIGS. 2 and 4, the axial limiting member 42 and the coupling arm 30 may also be provided with a pressing member 43 therebetween, and the pressing member 43 is squeezed between the coupling arm 30 and the axial limiting member 42. The structure and function of the pressing member 43 in the present embodiment may be the same as the structure and function of the pressing member in embodiment 1. The details may refer to the description of embodiment 1, which is not elaborated in the present embodiment.

The anti-rotation mode of the coupling arm 30 and the spindle 10 provided by the present embodiment can achieve the stepless adjustment for the angle of the coupling arm 30 relative to the horizontal plane, the user can adjust the angle of the coupling arm 30 along an adjustable direction in a stepless manner according to the needs, to adjust the height of the vehicle body relative to the horizontal plane in a stepless manner, and to adjust the damping stroke of the damping mechanism in a stepless manner.

Embodiment 4

Figure 3:
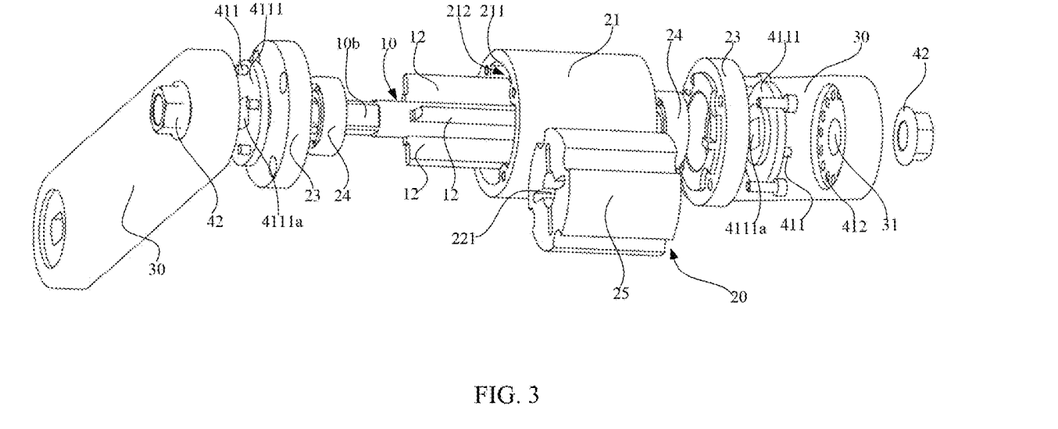
FIG. 3 is an exploded schematic view of a damping mechanism according to yet another embodiment of the present disclosure.

On basis of any one of embodiments 1 through 3, the present embodiment provides another elastic cushion assembly 20. FIG. 3 is an explored schematic view of a damping mechanism according to yet another embodiment of the present disclosure; and FIG. 4 is an exploded schematic view of a damping mechanism according to still another embodiment of the present disclosure. As illustrated in FIGS. 3 and 4, the rubber member may be fitted over the spindle 10, and the rubber member is circumferentially fixed to the spindle 10. Specifically, an inside shape of the rubber member may match with an outside shape of the spindle 10, and the rubber member may be located between the cavity wall 211 and the spindle 10. When mounting, the rubber member may be fitted over spindle 10 the along the axial direction of the spindle 10, resulting in a convenient mounting.

There is a structure between the outside of the spindle 10 and the inside of the rubber member for hindering the relative rotation of them. For example, the outside of the spindle 10 has a protruding rib, and a recess fitted with the protruding rib of the spindle 10 is defined in a center of the rubber member. Thus, during usage of the vehicle, the vibration reduction of the vehicle body can be stably performed.

More specifically, as illustrated in FIG. 3, an outer side wall of the spindle 10 over which the rubber member is fitted has a protruding rib 12; four protruding ribs 12 are provided, the four protruding ribs 12 are evenly distributed on the outer side wall of the spindle 10 in a cross shape, and a cross-shaped through hole 221 fitted with the four protruding ribs 12 is defined in a center of the rubber member. Through the fitting of the cross-shaped protruding rib and the cross-shaped through hole 221, the rubber member can be firmly fixed to the spindle 10 in the circumferential direction.

In the present embodiment, as illustrated in FIG. 3, the cushioning cavity 21 may be an integrally molded member, or, as illustrated in FIGS. 1 and 2, the cushioning cavity 21 may include a first cavity 21a and a second cavity 21b, and the first cavity 21a is detachably coupled to the second cavity 21b. The first cavity 21a and the second cavity 21b can be spliced into the cushioning cavity 21, facilitating the assembly and replacement of the cushioning member 22 in the cushioning cavity 21.

It should be noted that, the structural form of the cushioning cavity 21 and the structural form of the anti-rotation assembly 41 in the present embodiment can employ the same mode as embodiments 1 to 3. As illustrated in FIG. 3, the anti-rotation assembly 41 employs the mode of embodiment 2. As illustrated in FIG. 4, the anti-rotation assembly 41 employs the form of embodiment 3. Other possible modes can be employed, which is not limited by the present embodiment.

Further, as illustrated in FIGS. 1 to 3, two ends of the cushioning cavity 21 may also be provided with two lateral cavity covers 23, and the two lateral cavity covers 23 are detachably coupled to two ends of the cushioning cavity 21. The cushioning member 22 can be more stably accommodated in the receiving cavity 212 through the lateral cavity cover 23, and the cushioning member 22 is not easy to slide along the axial direction. Moreover, more preferably, the lateral cavity cover 23 may be sealingly coupled to the cushioning cavity 21. Thus, it can effectively ensure that the cushioning member 22 in the receiving cavity 212 is not easy to damage or corrode, effectively improving the service life of the components.

Based on any one of the above embodiments, the damping mechanism may also include a bearing 24, and the lateral cavity cover 23 may be coupled to the spindle 10 through the bearing 24. Specifically, an outer ring of the bearing 24 may be in an interference fit with the lateral cavity cover 23, and an inner ring of the bearing 24 may be in an interference fit with the spindle 10. Thus, during the traveling of the vehicle, in some work conditions, the vehicle body can have a certain amount of rollover relative to the spindle 10. Through the design of the bearing 24, it can effectively ensure that there is sufficient space between the lateral cavity cover 23 and the spindle 10 for rotation, and the sealing performance of the lateral cavity cover 23 to the receiving cavity 212 is enhanced to the greatest extent.

With reference to FIGS. 1 to 2, the damping mechanism provided by the present disclosure further includes a lateral cushioning member 25, and the lateral cushioning member 25 may be provided between the lateral cavity cover 23 and the coupling arm 30; or, the lateral cushioning member 25 is provided between the lateral cavity cover 23 and the cushioning cavity 21; or, the lateral cushioning member 25 is provided between the lateral cavity cover 23 and the coupling arm 30, and provided between the lateral cavity cover 23 and the cushioning cavity 21. Lateral impact can be effectively absorbed by the lateral cushioning member 25; furthermore, the use safety of the vehicle can be ensured, and the components of the damping mechanism are not easy to damage.

Embodiment 5

Embodiments of the present disclosure also provide a vehicle, including a vehicle body (not illustrated in the figures), a front end and/or a rear end of the vehicle body is mounted with a damping mechanism according to any one of the embodiments 1 to 4.

FIG. 5 is a view showing a coupling state of a damping mechanism and a coupling rod of a front end of an electric scooter provided by an embodiment of the present disclosure. As illustrated in FIG. 5, further, the vehicle is an electric scooter, and the manipulating arm 100 of the vehicle body of the electric scooter is coupled to a pedal (not illustrated in the figures) of the vehicle body. A lower end of the manipulating arm 100 is fixed with a main arm 200, and an end of the main arm 200 away from the manipulating arm 100 is located behind the front wheel 300.

The front end of the vehicle body is mounted with the damping mechanism, and the elastic cushion assembly is coupled to the end of the main arm 200 away from the manipulating arm 100. The electric scooter may also include a fender 400, and the fender 4M may be provided to two sides of the main arm 200 in a left-right direction. When the electric scooter is traveling, the fender 400 can effectively prevent the front muddy water, dust, etc., from sprinkling towards the user's legs, thereby further improving the user experience.

Further, the fender 400 may be detachably coupled to the main arm 200 through a fastener such as a bolt, to detach the fender 400 from the main arm 200, for separate cleaning of the fender 400, effectively improving the operational convenience.

Additionally, the rear end of the vehicle body may also be mounted with the damping mechanism, and the elastic cushion assembly is coupled to the pedal of the vehicle body. The front and rear of the electric scooter are each mounted with the damping mechanism, the uniform vibration reduction of the electric scooter in a front-rear direction can be effectively ensured, and the vehicle stability and the user riding experience can be improved.

It should be noted that, the structure and function of the damping mechanism in the present embodiment are the same as any one of the embodiments 1 to 4. The details may refer to the description of the embodiment 1 to 4, which is not elaborated herein.

In addition, without conflicting, various embodiments or examples or features of various embodiments or examples described in the present specification may be combined by those skilled in the art.

It should be finally noted that, the above embodiments are only for purpose of explaining the technical solution of the present disclosure, but not limitation; although the present disclosure is described in detail with reference to the afore-described embodiments, a person having ordinary skills in the art could understand that the technical solutions recited in the afore-described embodiments can still be modified, or equivalent replacement to part of the technical features thereof can be performed; and these modification and the replacements do not cause the essence of the corresponding technical solution to depart from the spirit and scope of the technical solution of the embodiments of the present disclosure.

What is claimed is:

1. A damping mechanism applied to a vehicle, a vehicle body and a wheel of the vehicle being coupled through the damping mechanism, and the damping mechanism comprising:
a spindle;
an elastic cushion assembly configured to couple the spindle and the vehicle body;
a coupling arm having a first end configured to be fixedly coupled to an axle of the wheel and a second end pivotally coupled to the spindle; and
a locking assembly provided between the coupling arm and the spindle and configured to switch the coupling arm and the spindle between at least two locking states and an unlocking state,
wherein in the unlocking state, the coupling arm is rotatable relative to the spindle, and in the locking states, the coupling arm is locked relative to the spindle; in each of the locking states, the coupling arm is in different locking positions relative to the spindle; and when the coupling arm is in different locking positions, the coupling arm is at different angles relative to a horizontal plane,
wherein the locking assembly comprises: an anti-rotation assembly provided between the coupling arm and the spindle and configured to hinder relative rotation of the coupling arm and the spindle when in the locking states; and in axial limiting member movably provided to the spindle, the coupling arm having a through hole for the spindle passing through, the axial limiting member being located at a side of the coupling arm away from the anti-rotation assembly and configured to abut against the coupling arm along an axial direction in the locking states;
wherein the anti-rotation assembly comprises: a first anti-rotation member provided to the coupling arm; and a second anti-rotation member provided to the spindle and fixed to the spindle along the circumferential direction; wherein the first anti-rotation member is fitted over the second anti-rotation member, and the second anti-rotation member has a latch position and a non-latch position on a side surface of the second anti-rotation member; in the locking state, the first anti-rotation member abuts against the latch position of the second anti-rotation member to grip the coupling arm, the first anti-rotation member and the second anti-rotation member tightly; in the unlocking state, the first anti-rotation member moves to the non-latch position of the second anti-rotation member to enable relative rotation of at least two of the coupling arm, the first anti-rotation member and the second anti-rotation member; and
wherein the first anti-rotation member comprises a roller cage and a plurality of rollers provided on the roller cage, the roller cage is provided in an accommodating cavity of the coupling arm, the plurality of rollers are distributed to a side surface of the roller cage along the circumferential direction, and the rollers is movable in a radial direction of roller cage; the second anti-rotation member is a ratchet wheel fixed to the spindle along the circumferential direction, and the ratchet wheel is fitted inside the roller cage; in the locking state, the roller abuts between a wall of the accommodating cavity and the latch position of the ratchet wheel to grip the coupling arm, the roller and the ratchet wheel tightly; in the unlocking state, the roller moves to the non-latch position of the ratchet wheel along the radial direction, and the coupling arm is rotatable relative to the roller cage and the ratchet wheel.

2. The damping mechanism according to claim 1, wherein the axial limiting member and the coupling arm are provided with a pressing member therebetween, and the pressing member is squeezed between the coupling arm and the axial limiting member.

3. The damping mechanism according to claim 1, wherein the axial limiting member is detachably coupled to the spindle.

4. The damping mechanism according to claim 1, wherein the anti-rotation assembly comprises:
  a positioning member provided on one of the spindle and the coupling arm; and
  a fitting part provided on the other one of the spindle and the coupling arm,
  wherein the positioning member and the fitting part have a plurality of fitting positions such that the coupling arm is in different locking positions relative to the spindle, the positioning member is fixed relative to the fitting part along a circumferential direction, and the positioning member and the fitting part are separable from each other along the axial direction in the unlocking state.

5. The damping mechanism according to claim 4, wherein at least two positioning members are provided;
  a plurality of fitting parts are provided with a number of the fitting pans being greater than a number of the positioning members and the plurality of fitting parts being distributed about an axis of the spindle along the circumferential direction;
  the positioning member is selectively snap-fitted with a part of the plurality of fitting parts to adjust the locking position of the coupling arm.

6. The damping mechanism according to claim 5, wherein the positioning member is a protrusion extending towards the coupling arm, and the fitting part is a groove or a recess fitted with the protrusion.

7. The damping mechanism according to claim 6, wherein a positioning disc is fitted over the spindle, and the positioning disc is fixed to the spindle along the circumferential direction, and the protrusion is formed on the positioning disc.

8. The damping mechanism according to claim 4, wherein the positioning member is a spline formed on the spindle, and the fitting part is a spline hub structure formed on the coupling arm;
  or, the positioning member is a knurl, and the fitting part is a knurled groove formed on the coupling arm and configured to be fitted with the knurl.

9. The damping mechanism according to claim 1, wherein the anti-rotation assembly further comprises:
  an elastic return member having a first end coupled to the ratchet wheel and a second end coupled to the roller cage, and deformation of the elastic return member increases during rotation of the roller from the latch position to the non-latch position.

10. The damping mechanism according to claim 1, wherein the elastic cushion assembly comprises:
  a cushioning cavity comprising a cavity wall and a receiving cavity enclosed by the cavity wall, the cavity wall being fitted over the spindle and fixedly coupled to the vehicle body; and
  a cushioning member accommodated in the receiving cavity and abutting against the cavity wall and the spindle.

11. The damping mechanism according to claim 10, wherein the cushioning member comprises a rubber member, the cushioning member is cylindrical, a side wall of the spindle is defined with a groove matching with the rubber member, and the rubber member is accommodated in the groove along an axial direction parallel to the spindle;
  wherein a plurality of the rubber members are provided, a number of the grooves in the spindle is identical to a number of the rubber members, and the plurality of rubber members are evenly distributed in the circumferential direction of the spindle.

12. The damping mechanism according to claim 11, wherein the rubber member is fitted over the spindle, and the rubber member is fixed to the spindle along the circumferential direction.

13. The damping mechanism according to claim 12, wherein an outer side wall of the spindle over which the rubber member is fitted has a protruding rib; four protruding ribs are provided, the four protruding ribs are evenly distributed on the outer side wall of the spindle in a cross shape, and a cross-shaped through hole fitted with the four protruding ribs is defined in a center of the rubber member.

14. The damping mechanism according to claim 10, wherein the cushioning cavity comprises a first cavity and a second cavity, and the first cavity is detachably coupled to the second cavity;
  or, the cushioning cavity is an integrally molded member.

15. The damping mechanism according to claim 10, wherein the cushioning cavity further comprises two lateral cavity covers, and the two lateral cavity covers are detachably coupled to two ends of the cushioning cavity, respectively;
  wherein the two lateral cavity covers are sealingly coupled to the cushioning cavity.

16. The damping mechanism according to claim 15, further comprising a bearing, and the lateral cavity cover being coupled to the spindle through the bearing;
  a lateral cushioning member, wherein
  the lateral cushioning member being provided between the lateral cavity cover and the coupling arm; or
  the lateral cushioning member being provided between the lateral cavity cover and the cushioning cavity; or
  the lateral cushioning member being provided between the lateral cavity cover and the coupling arm and the lateral cushioning member being provided between the lateral cavity cover and the cushioning cavity.

17. A vehicle, comprising a vehicle body,
  wherein a front end the vehicle body being mounted with a damping mechanism; or
  a rear end of the vehicle body being mounted with a damping mechanism; or
  both the front end and the rear end of the vehicle body being mounted with a damping mechanisms;
  the damping mechanism comprising:
  a spindle;
  an elastic cushion assembly configured to couple the spindle and the vehicle body;
  a coupling arm having a first end configured to be fixedly coupled to an axle of the wheel and a second end pivotally coupled to the spindle; and
  a locking assembly provided between the coupling arm and the spindle and configured to switch the coupling arm and the spindle between at least two locking states and an unlocking state, wherein in the unlocking state, the coupling arm is rotatable relative to the spindle, and in the locking states, the coupling arm is locked relative to the spindle; in each of the locking states, the coupling arm is in different locking positions relative to the spindle; and when the coupling arm is in different locking positions, the coupling arm is at different angles relative to a horizontal plane, wherein the locking assembly comprises: an anti-rotation assembly provided between the coupling arm and the spindle and configured to hinder relative rotation of the coupling arm and the spindle when in the locking states; and an axial limiting member movably provided to the spindle, the coupling arm having a through hole for the spindle passing through, the axial limiting member being located at a side of the coupling arm away from the anti-rotation assembly and configured to abut against the coupling arm along an axial direction in the locking states;

wherein the anti-rotation assembly comprises: a first anti-rotation member provided to the coupling arm, and a second anti-rotation member provided to the spindle and fixed to the spindle along the circumferential direction: wherein; the first anti-rotation member is fitted over the second anti-rotation member, and the second anti-rotation member has a latch position and a non-latch position on a stile surface of the second anti-rotation member; in the locking state, the first anti-rotation member abuts against the latch position of the second anti-rotation member to grip the coupling arm, the first anti-rotation member find the second anti-rotation member in the unlocking state, the first anti-rotation member moves to the non latch position of the second anti-rotation; member to enable relative rotation of at least two of the coupling arm, the first anti-rotation member and the second anti-rotation member; and wherein the first anti-rotation member comprises r roller cage and a plurality of rollers provided on the roller cage, the roller cage is provided in an accommodating cavity of the coupling arm, the plurality of rollers are distributed to a side surface of the roller cage along the circumferential direction, and the rollers is removable in a radial direction of the roller cage; the second anti-rotation member is a ratchet wheel fixed to the spindle along the circumferential direction, and the ratchet wheel is fitted inside the roller cage; in the locking state, the roller abuts between a wall of the accommodating cavity and the latch position of the ratchet wheel to grip the coupling arm, the roller and the ratchet wheel tightly; in the unlocking state, the roller moves to the non-latch position of the ratchet wheel along the radial direction, and the coupling arm is rotatable relative to the roller cage and the ratchet wheel.

18. A damping mechanism applied to a vehicle, vehicle body and a wheel of the vehicle being coupled through the damping mechanism, and the damping mechanism comprising, a spindle;

an elastic cushion assembly configured to couple the spindle find the vehicle body;

a coupling arm having a first end configured to be fixedly coupled to an axle of the wheel and a second end pivotally coupled to the spindle; and a locking, assembly provided between the coupling arm and the spindle and configured to switch the coupling arm and the spindle between; at least two locking states and an unlocking state, wherein in the unlocking state, the coupling arm is rotatable relative to the spindle, and in the locking states, the coupling arm is locked relative to the spindle; in each of the locking states, the coupling arm is in different locking positions relative to the spindle; and when the coupling arm is to different locking positions, the coupling arm is at different angles relative to a horizontal plane, wherein the locking assembly comprises: an anti-rotation assembly provided between the coupling arm and the spindle and configured to hinder relative rotation of the coupling arm and the spindle when in the locking states; and an axial limning member movably provided to the spindle, the coupling arm having a through hole for the spindle passing through, the axial limiting member being located at a side of the coupling arm away from the anti-rotation assembly and configured to abut against the coupling arm along an axial direction in the locking states;

wherein the elastic cushion assembly comprises: a cushioning cavity comprising a cavity wall and a receiving cavity enclosed by the cavity wall, the cavity wall being fitted over the spindle and fixedly coupled to the vehicle body; and a cushioning member accommodated in the receiving cavity and abutting against the cavity wall and the spindle; and wherein the cushioning cavity further comprises two lateral cavity covers, and the two lateral cavity covers are detachably coupled to two ends of the cushioning cavity, respectively; the two lateral cavity covers are sealingly coupled to the cushioning cavity.

* * * * *